United States Patent [19]

Suggs et al.

[11] 4,310,556

[45] Jan. 12, 1982

[54] FOOD EMULSIFIERS

[75] Inventors: James L. Suggs, Greeneville; Dan F. Buck, Kingsport; Howard K. Hobbs, Blountville, all of Tenn.

[73] Assignee: Eastman Kodak Company, Rochester, N.Y.

[21] Appl. No.: 211,977

[22] Filed: Dec. 1, 1980

[51] Int. Cl.³ .............................................. A21D 2/16
[52] U.S. Cl. ...................................... 426/96; 426/98; 426/564; 426/566; 426/570; 426/571; 426/572; 426/653; 426/654; 426/549; 426/496; 252/351
[58] Field of Search ................ 252/351, 358; 426/654, 426/96, 98, 653, 564, 566, 570, 572, 571, 496, 549

[56] References Cited

U.S. PATENT DOCUMENTS

| | | | |
|---|---|---|---|
| 3,453,116 | 7/1969 | Freund | 426/654 |
| 3,843,817 | 10/1974 | Swicklik et al. | 426/654 |
| 3,958,033 | 5/1976 | Sims et al. | 426/654 |
| 4,137,338 | 1/1979 | Gawrilow | 426/654 |
| 4,159,952 | 7/1979 | Jackson | 426/654 |
| 4,229,480 | 10/1980 | Suggs et al. | 426/654 |

Primary Examiner—Jeanette M. Hunter
Attorney, Agent, or Firm—John F. Stevens; Daniel B. Reece, III

[57] ABSTRACT

Disclosed are emulsifiers useful in food products such as cakes, icings, cream fillings, whipped toppings, etc. The emulsifiers comprise a blend of succinylated monoglycerides, monoglycerides, propylene glycol monoesters and an alkali metal salt of a fatty acid. The emulsifiers are essentially totally active and do not require the use of a carrier.

7 Claims, No Drawings

FOOD EMULSIFIERS

BACKGROUND OF THE INVENTION

1. Field of the Invention

This invention relates generally to food emulsifiers, and more specifically this invention relates to dry powdered emulsifiers which are essentially totally active and can be added directly to foods without first mixing with a carrier.

2. Description of the Prior Art

It is known to use aerating emulsifiers in foods to improve texture by lowering the density. For example, emulsifiers are used in connection with the baking of various products to provide improvement in the structural characteristics of the baked goods such as grain, texture, softness and volume. Also, some emulsifiers improve the handling characteristics or machineability of the batter for the baked goods. These emulsifiers depend on the addition of a diluent or carrier because they are not active emulsifiers and aerating agents unless they are preblended with a carrier such as water, fats, oils, etc. The use of such carriers is undesirable for several obvious reasons. Handling of the concentrated powdered emulsifier is preferred to handling the diluted emulsifier. Also, flavor is often affected by carriers.

Patents of interest in this field include U.S. Pat. No. 3,370,958 which deals with succinylated monoglyceride and its use in combination with other food emulsifiers in the presence of fats or oils used in baking. U.S. Pat. No. 3,494,771 relates to adding to emulsifiers a dispersion consisting essentially of (1) a conjointly solidified mixture of propylene glycol monostearate and a monoglyceride, (2) stearoyl lactylic acid, and (3) water. This patent discloses that the components may be melted together to form a molten blend, which is then spray chilled to form a beadlet product. It is also known to blend propylene glycol monoesters, monoglycerides and succinylated monoglycerides, and to subsequently form a powder therefrom which must be melted in a carrier to be useful as an emulsifier.

According to the present invention, there is provided a composition which is particularly useful as an emulsifier for food products. Such products have low density and good volume when used with the emulsifier described herein. The emulsifiers according to the present invention are in particulate form and are essentially totally active (i.e., do not contain diluents or carriers) and can be added directly to food products such as cake batter, icing, whipped toppings, cream fillings, without first preblending with a component of the food or by the addition of a carrier.

DISCLOSURE OF THE INVENTION

In accordance with the invention, a solid solution of (1) propylene glycol monoesters, (2) monoglycerides, (3) succinylated monoglycerides and an alkali metal salt of at least one fatty acid is prepared and used as an emulsifier. An important advantage in using this emulsifier is the fact that it can be used in dry, particulate forms which is essentially totally active. Mixing with other ingredients such as shortening is not required.

The solid solution in accordance with this invention contains compounds I, II, III and IV identified as:

I. Propylene glycol monoesters

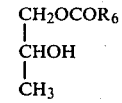

wherein $R_6$ is the residue of a straight chain saturated fatty acid having 8 to 22 carbon atoms. Preferably $R_6$ is the residue of stearic acid, palmitic acid or a blend thereof.

II. Monoglycerides

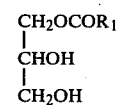

wherein $R_1$ is the residue of a straight chain fatty acid having from 8 to 22 carbon atoms, and the monoglyceride has an iodine value of from about 2 to about 15, preferably about 4–10.

III. Succinylated Monoglycerides

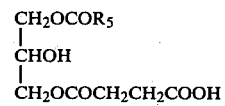

wherein $R_5$ is the residue of a straight chain saturated fatty acid having from 8 to 22 carbon atoms.

IV. An alkali metal salt of at least one fatty acid having 8–22 carbon atoms.

The composition contains about 15–40 parts (preferably about 25–35) by weight of Compound I, about 25–45 parts (preferably about 35–45) by weight of Compound II, about 15–40 parts (preferably about 25–35) by weight of Compound III and about 5–18 parts (preferably about 10–18) by weight of Compound IV.

Although compositions containing as little as about 40% of the monoesters are somewhat effective, much better results are obtained with higher purity compositions. As a practical matter, diglycerides, triglycerides, unreacted material, etc., exist to an extent as impurities.

To produce the solid solution, the ingredients are preferably melt blended as described herein. Also, glycerine or propylene glycol may be esterified simultaneously with saturated and unsaturated acids (or, of course, the mixture of acids obtained from animal fat and/or vegetable oil) as described herein to obtain the solid solution.

The fatty acid moiety generally comprises 8–22 carbon atoms and usually 14–20 carbon atoms. The monoglycerides may be prepared by blending saturated and unsaturated monoglycerides. A saturated monoester is a fatty acid monoester, wherein the fatty acid moiety is chemically saturated. A saturated monoester product is one consisting of at least one saturated monoester and having a total monoester concentration of at least about 40%, normally at least 60% by weight, and preferably at least about 90% by weight, and an iodine value [AOCS Official Method Cd 1-25 (rev. April, 1956), Official and Tentative Methods of the American Oil Chemists Society, 2nd ed., additions and revisions 1947 through 1963, inclusive] generally in a range from 0 to about 5 and preferably less than about 1. An unsaturated monoester is a fatty acid monoester wherein the fatty acid moiety is chemically unsaturated (at least only partially hydrogenated). An unsaturated monoester product is one consisting essentially of at least one unsaturated monoester and having a total monoester concentration of at least about 40%, normally at least 60% by weight, and preferably at least about 90% by weight, and an iodine value generally in a range from about 5 to about 75. On the other hand, the monoglyceride may be prepared by esterifying selected acids to result in the required iodine value, or by esterifying acids which have been hydrogenated to a degree which will result in the required iodine value.

The monoester ingredients of this invention are made in accordance with well-known procedures. One conventional procedure is the direct esterification of one or more fatty acids with glycerol or propylene glycol followed preferably by distillation to obtain a high purity product containing one or more monoester. Other procedures for the preparation of distilled, high purity monoglyceride products are disclosed in the U.S. Pat. Nos. 2,634,234, 2,634,278 and 2,634,279, to Kuhrt. Such distilled monoesters products usually contain monoesters at a concentration of at least about 90% by weight.

A preferred saturated monoester is a distilled monoester product made from fully hydrogenated lard with an iodine value in a range from about 0.4 to about 1. Other preferred saturated monoester products include the distilled monoester products made from fats such as tallow, palm oil, cottonseed oil, soybean oil, peanut oil, sesame oil and the like, which have been fully hydrogenated, the distilled monoester products made from such saturated fatty acids as palmitic acid, stearic acid and the like, and blends of distilled monoester products. Commercially available saturated monoesters include Myverol 18-00, 18-04, 18-06 and 18-07 distilled monoglycerides, products of Eastman Chemical Products, Inc.

A preferred unsaturated monoester is a distilled monoester made from lard. Other preferred unsaturated monoesters include the distilled monoester made from fats such as tallow, cottonseed oil, palm oil, soybean oil, peanut oil, corn oil, sesame seed oil and the like, the distilled monoester products made from such unsaturated fatty acids as oleic acid, linoleic acid and the like, and blends of these distilled monoesters. Commercially available unsaturated monoglycerides include Myverol 18-30, 18-35, 18-40, 18-50K, 18-85, and 18-98 distilled monoglycerides, products of Eastman Chemical Products, Inc.

Preservatives such as antioxidants (for example, propyl gallate, butylated hydroxy toluene, butylated hydroxy anisole and the like) and metal complexing agents (for example, glycine, phosphoric acid and the like) are preferably employed. Concentrations are conventional, generally being less than 1% by weight of the dispersion.

Succinylated monoglyceride which may be used in the solid solution is half ester of succinic acid and of a monoacylated polyhydric alcohol, or its salt. This compound or its salt may be represented by the following general formula:

$$A(OH)_n \cdot (F_m) \cdot (SCOOM)$$

in which compound F is a residue of an even numbered, straight chain saturated fatty acid having from 14 to 24 carbon atoms; SCOO is the succinic acid residue or the salt thereof; A is a residue of a polyhydric alcohol having a straight chain length of from 2 to 6 carbon atoms; m is equal to 1; n is a number from zero to 4; and M is hydrogen, an edible alkali metal or alkaline earth.

Stearic acid is the preferred fatty acid residue in the succinylated monoglyceride, but myristic, palmitic and behenic acids provide satisfactory residues. The fatty acid residue should be substantially completely hydrogenated. Also, the preferred polyhydric alcohol residue is a glycerol residue, thus providing a free hydroxyl group on the glycerol residue. However, a propylene glycol residue provides a compound having no free hydroxyl group and which is a satisfactory compound.

Succinylated monoglyceride is described in U.S. Pat. No. 3,370,958 and is a commercially available product, marketed by Eastman Chemical Products, Incorporated, under the trademark Myverol SMG Type V succinylated monoglyceride.

In the preparation of the succinyl half esters, succinic acid is preferably utilized in its anhydride form. The preparation of the compound of this invention is controlled to provide a low degree of polymerization and to maximize the half ester content of the succinyl half ester.

If the reactants utilized in the preparation of succinyl half esters are substantially pure and the preferred conditions for reaction are utilized then the resulting product will be predominantly succinyl half ester. On the other hand, if the reactants are not substantially pure and/or the preferred reaction conditions are not employed, then some byproducts are formed thereby providing a mixture.

In the preparation of the succinyl half esters, the monoacylated polyhydric alcohol can be prepared by esterification of the polyhydric alcohol, e.g., glycerol, with a fatty acid having an even chain length of from 14 to 24 carbon atoms, which is preferably stearic acid. In this connection, the fatty acid is reacted with the polyhydric alcohol under such conditions that the polyhydric alcohol is present in a substantial excess in order to assure provision of a preponderance of a monoacylated compound. The water solubility of the succinyl half ester can be substantially increased by forming alkali salts of the succinyl half esters.

It will be understood that various amounts of diesters or tri-esters of the higher fatty acid and polyhydric alcohol may be present with the mono-esters. The presence of these polyester compounds does not provide compounds or derivatives which are functional to improve the overall baking properties. Since, in an equilibrium reaction, the esterification will provide about 60 percent mono-acylated ester and about 35 percent of the di-acylated ester, the reaction mixture desirably is molecularly or otherwise distilled to enrich the mixture in mono-acrylated ester. The succinyl half ester is desirably prepared with a mono-acylated ester content of not less than about 50 percent and, preferably, the succinyl half esters are prepared with molecularly distilled mono-acylated ester wherein the mono-acylated ester is present at a level of at least about 90 percent.

The mono-acylated ester of the polyhydric alcohol is then preferably reacted with succinic anhydride, although succinic acid may be used, under suitable conditions. These reaction conditions are controlled so as to provide maximum amounts of the half ester of the acid, as distinguished from the full or neutral ester, and to minimize polymerization. This control is effected by measurement of the acid number and by termination of the reaction when the acid number is about one-half of the original acid number of the reactants. In this connection, each molecule of the succinic anhydride is reacted with one molecule of the mono-acylated polyhydric alcohol at one of its hydroxyl groups. If the reaction conditions are not suitably controlled, the free carboxyl groups on the half ester are reduced and the yield of the succinyl half ester is reduced.

The commercially available monoester obtained by the esterification of 1,2-propyleneglycol with stearic acid is a mixture of two isomers, the monoester having a secondary OH group being predominant. The propylene glycol monoester possessing a secondary OH group is the preferred one for the purposes of the invention. Stearic acid is the preferred fatty acid moiety of the ester, but other fatty acid moieties deriving from oils and fats, which after hydrogenation possess a high content of stearic acid, are also useful. Unsaturated fatty acid moieties are nonfunctional. Examples of fats and oils from which the stearic acid moiety can be drived are soybean oil, cottonseed oil, lard and tallow. Hydrogenation of the fatty acid moieties can be performed before or after formation of the propylene glycol monoester. Their principal fatty moiety after hydrogenation is stearic acid. Thus, one of the main components of the emulsifier system is 1,2-propylene glycol-1-monostearate (PGMS).

It is important that the propylene glycol monoester have a high monoester content, since the presence of propylene glycol diester accelerates the transition from the alpha to the beta crystalline state. Thus, propylene glycol monoester which has been purified by molecular distillation is the preferred compound.

The composition according to this invention may be prepared by melt blending the ingredients until a homogeneous mass is obtained and then forming particles from the mass. Melt blending may be accomplished by individually maintaining or raising the temperatures of the compounds to a point above their respective melting temperatures so each is a molten mass and then thoroughly blending, or by mixing the ingredients at room temperature and then raising the temperature of the mixture at least to the melting point of the highest-to-melt ingredient followed by thoroughly blending to form a homogeneous mass. Preferably, melt blending is accomplished at a temperature of between about 80° C. and 120° C. Powdering may be accomplished by conventional means such as, for example, spray chilling, freezing and pulverizing, or by any other means known in the art. Laboratory experiments indicate that the quality of product produced on small scale in a blender using dry ice is quite satisfactory. Forming particles is accomplished by first heating a mixture of the selected ingredients until a molten or liquified mass is formed, and then rapidly stirring until the mass is homogenized. For example, 100 grams of molten mixture in a 250 ml. beaker may be stirred until the mixture is found to be homogeneous. The mixture may then be poured out and cooled until solidified, typically for about 3–4 hours at room temperature. Particles may then be formed in a high speed stirring device such as a Waring Blendor using dry ice. The dry ice is subsequently evaporated and the powder particles sieved to an approximate size of 50–1000 microns. The particles are white, free flowing, and consist essentially of a homogeneous blend of the monoglycerides, succinylated monoglycerides, propylene glycol monoesters and alkali metal salt of fatty acid.

The composition produced as described above is found to be especially useful in the production of cakes and similar products. The composition is most conveniently added to the batter.

The following examples are included for a better understanding of the invention. In the examples, the emulsifier composition is made by blending the following dry ingredients:

40 parts by weight monoglyceride (iodine value of 2)
30 parts by weight succinylated monoglyceride
30 parts by weight propylene glycol monoester
18 parts by weight potassium stearate The solid components are melted together, mixed as liquids, cooled to a solid mass then powdered. The emulsifier is used in cake batters, icings and cream fillings according to the receipts below. The emulsifier is added over-the-side to the batter.

The emulsifier is generally used in cake batters at a level of about 1–5% based on the weight of flour and in icings, cream fillings, whipped toppings at a level of about 1–4% based on the weight of shortening.

CAKE

This example illustrates a specific embodiment of a yellow cake (120% sugar) and batter therefor according to this invention.

The recipe is as follows:

| Ingredients | Percent by wt. of flour |
| --- | --- |
| Cake flour | 100 |
| Granulated sugar | 120 |
| Milk powder | 10 |
| Salt | 3 |
| Baking powder | 2 |
| Salad oil (wintered cottonseed oil) | 35 |
| Water | 85 |
| Whole eggs | 50 |
| Vanilla | 1 |
| Emulsifier composition | |

The liquid ingredients are mixed together with a spoon or spatula and poured onto the solid ingredients. The liquid and solid ingredients are then mixed together with a Hobart mixer with a wire whip at No. 1 speed for ½ minute and then for 3 minutes at No. 2 speed. The result is a good, smooth batter, a typical density of which is 0.62.

The batter is placed into one or more baking tins, a suitable quantity being approximately 300 grams of batter for each 8 inch baking tin. The tin or tins, as the case may be, are placed into an oven and baked for 24 minutes at 350° F. The resulting cake or cakes is or are moist and fine grained.

The batter densities are as indicated below:

| Example | | Amount of Emulsifier Added, gm | Density |
| --- | --- | --- | --- |
| 1 | | 1.7 | 0.68 |
| 2 | | 2.3 | 0.52 |
| 3 | | 3.7 | 0.78 |
| 4 | | 1.7 | 0.69 |
| 5 | | 1.7 | 0.66 |
| 6 | Control (No potassium stearate in emulsifier) | 1.7 | 1.04 |

In the above examples, the emulsifiers are added without preblending with a diluent or carrier. The emulsifiers are found to cause aeration of the cake batter as indicated by good volume, low density and desirable physical characteristics such as texture.

As in the case with cake batter emulsifiers, a principle advantage of the composition according to the present invention is the fact that it can be added to foods such as cream fillings, icings, and toppings in a dry form rather than as a part of the shortening or in a hydrated form. When the dry emulsifier described above is added to cream fillings, rings and toppings in amounts ranging from about 1-4% based on the weight of shortening, results are generally similar to the use of equal amounts of control emulsifiers.

Unless otherwise specified, all percentages, ratios, parts, etc., are by weight.

By the term solid solution, we mean a homogeneous crystalline material containing two or more substances in variable propertion.

The iodine values specified herein are measured in accordance with AOCS Official Method Cd 1-25 (rev. April, 1956), Official and Tentative Methods of the American Oil Chemists Society, 2nd ed., additions and revisions 1947 through 1963, inclusive.

The invention has been described in detail with particular reference to certain preferred embodiments thereof, but it will be understood that variations and modifications can be effected within the spirit and scope of the invention.

We claim:

1. A dry emulsifier composition comprising
   (a) about 15-40 parts by weight of succinylated monoglycerides,
   (b) about 25-45 parts by weight of monoglycerides having an iodine value of about 2 to about 15,
   (c) about 15-40 parts by weight of propylene glycol monoesters, and
   (d) about 5-18 parts by weight of an alkali metal salt of at least one fatty acid having 8-22 carbon atoms.

2. Composition according to claim 1 wherein said monoglyceride has an iodine value of about 4-10.

3. A dry emulsifier composition comprising
   (a) about 25-35 parts by weight of succinylated monoglycerides,
   (b) about 35-45 parts by weight of monoglycerides having an iodine value of about 2 to about 15,
   (c) about 25-35 parts by weight of propylene glycol monoesters, and
   (d) about 10-18 parts by weight of an alkali metal salt of at least one fatty acid having 8-22 carbon atoms.

4. Composition according to claim 3 wherein said monoglyceride has an iodine value of about 4-10.

5. A food product containing an emulsifying amount of the composition according to claim 1.

6. A food product containing an emulsifying amount of the composition according to claim 3.

7. Method of aerating a food product which comprises whipping into said food product an effective amount of a composition in particulate form, the particles consisting essentially of a homogeneous blend of
   (a) about 15-40 parts by weight of succinylated monoglycerides,
   (b) about 25-45 parts by weight of monoglycerides having an iodine value of about 2 to about 15,
   (c) about 15-40 parts by weight of propylene glycol monoesters, and
   (d) about 5-18 parts by weight of an alkali metal salt of at least one fatty acid having 8-22 carbon atoms.

* * * * *